United States Patent
Tokuyoshi

(10) Patent No.: US 9,626,794 B2
(45) Date of Patent: Apr. 18, 2017

(54) STORAGE MEDIUM, INFORMATION PROCESSING APPARATUS AND CALCULATION METHOD

(71) Applicant: SQUARE ENIX CO., LTD., Tokyo (JP)

(72) Inventor: Yusuke Tokuyoshi, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 94 days.

(21) Appl. No.: 14/703,067

(22) Filed: May 4, 2015

(65) Prior Publication Data

US 2016/0005217 A1 Jan. 7, 2016

(30) Foreign Application Priority Data

Jul. 7, 2014 (JP) .................................. 2014-139981

(51) Int. Cl.
*G06T 15/50* (2011.01)
(52) U.S. Cl.
CPC .................................. *G06T 15/506* (2013.01)
(58) Field of Classification Search
CPC .................................................. G06T 15/506
See application file for complete search history.

(56) References Cited

U.S. PATENT DOCUMENTS

2006/0132486 A1   6/2006   Kim et al.

OTHER PUBLICATIONS

Wang et al., "All-Frequency Rendering of Dynamic, Spatially-Varying Reflectance", ACM Transactions on Graphics, vol. 28, No. 5, pp. 133:1-133:10 (Dec. 2009).
Xu et al, "A Practical Algorithm for Rendering Interreflections with All-Frequency BRDFs", ACM Transactions on Graphics, vol. 33, No. 1, Article 10, pp. 10:1-10:16 (Jan. 2014).
Xu et al, "Anisotropic Spherical Gaussians", pp. 1-11 (undated, ACM Trans. on Graphics, Nov. 2013.
Hasan et al., "Virtual Spherical Lights for Many-Light Rendering of Glossy Scenes", SIGGRAPH Asia 2009, pp. 1-6 (2009).
Wallace et al., "A Ray Tracing Algorithm for Progressive Radiosity", Computer Graphics, vol. 23, No. 3, pp. 315-324 (Jul. 1989).
Prutkin et al., "Reflective Shadow Map Clustering for Real-Time Global Illumination", EUROGRAPHICS 2012, pp. 1-4 (2012).
Toksvig, "Mipmapping Normal Maps", nVIDIA, TB-01256-001_v01, pp. 1-10 (Apr. 20, 2004).

(Continued)

*Primary Examiner* — Haixia Du
(74) *Attorney, Agent, or Firm* — Greenblum & Bernstein, P.L.C.

(57) ABSTRACT

An information processing apparatus obtains an incident radiance at a shading point by obtaining a light emission radiance of a target light source expressed by a spherical Gaussian (SG expressed), approximating by a spherical Gaussian (SG approximating) a function indicating a spread of the target light source from a perspective of the shading point, and obtaining the product of these. Also, the apparatus SG approximates a bidirectional reflection distribution function (BRDF) at a shading point, and calculates the radiance at the shading point based on information indicating the viewpoint for which the shading point is to be rendered, an incident radiance at the shading point, and the SG approximated BRDF at the shading point.

7 Claims, 6 Drawing Sheets

(56) References Cited

OTHER PUBLICATIONS

Laurijssen et al., "Fast Estimation and Rendering of Indirect Highlights", Eurographics Symposium on Rendering 2010, vol. 29, No. 4, pp. 1-9 (2010).
Extended European Search Report (EESR) issued by European Patent Office (EPO) in European Patent Application No. 15165800.2, dated Jan. 15, 2016.
Bruce Walter et al., "Lightcuts", ACM Transactions on Graphics (TOG), vol. 24, No. 3, XP055238687, US, pp. 1098-1107 (Jul. 1, 2005).
Kautz J. et al., "Fast, Arbitrary BRDF Shading for Low-Frequency Lighting Using Spherical Harmonics", Rendering Techniques 2002, Eurographics Workshop Proceedings, Pisa, Italy, Jun. 26-28, 2002; [Proceedings of the Eurographics Workshop], New York, NY : ACM, US, vol. Workshop 13, XP001232401, pp. 291-296 (Jun. 26, 2002).

STORAGE MEDIUM, INFORMATION PROCESSING APPARATUS AND CALCULATION METHOD

BACKGROUND OF THE INVENTION

Field of the Invention

The present invention relates to a storage medium, an information processing apparatus, and a calculation method, and particularly to a rendering expression technique for radiance that occurs in an object surface due to a light source.

Description of the Related Art

In recent years, in the field of computer graphics, various rendering expression techniques have been proposed and implemented in order to provide high quality and realistic graphics. One such rendering expression technique renders/reproduces a radiance that occurs due to a light source considering a material of an object (a rendering object) that is to be rendered, a light source type of an illumination which is arranged in the periphery of the object, or the like.

A radiance at a single point (a shading point) on a rendering object or a radiance on a single pixel on an image that is to be rendered is reproduced by summing the radiances that occur due to illumination (direct light) arranged in the periphery, and due to so-called indirect light which occurs by those light sources reflecting from particular surfaces. More specifically, a solution (the radiance due to each light source) to a rendering equation for each light source is obtained, and by integrating these, the radiance at a shading point due to the peripheral light sources is calculated. As one approach to obtaining this integration solution, for the indirect light, there exists an instant radiosity approach for approximating the indirect light from a plurality of virtual point lights. Also, regarding the direct light, there is an approach for obtaining an approximation solution for the integration by approximating a light source that has an area by a plurality of point light sources.

Meanwhile, in a scheme for simply approximating point light sources as described above, when the light source position and the shading point are extremely close, the shading point is of a material that shows a sharp reflection distribution as with a specular reflection, or the like, there are cases in which unnatural rendering results (a spike-form artifact) such as the shading point suddenly becoming bright are shown. This is due to a dispersion of an error becoming large when an item indicating the distance to the shading point exists in the denominator in the rendering equation, and a bidirectional reflection distribution function (BRDF) existing in the numerator is sharp.

In response to this, in Jiaping Wang et al., "All-Frequency Rendering of Dynamic, Spatially-Varying Reflectance", ACM Transactions on Graphics, Vol. 28 Number. 5, pp. 133:1-133:10, December, 2009, by approximating to a spherical Gaussian (SG approximating) a light source, occurrences of unnatural specular reflections in a scene that defines Spherical Light having a small radius as the direct light are eliminated.

However, because the approximation solution approach of the rendering equation that Wang et al. proposed ignores physics, tuning of parameters depending on the scene is necessary for each light source, and there are cases in which this is not realistic when there exist many light sources, or the user work corresponding to the tuning is cumbersome. Also, because Wang assumes only Spherical Light with a small radius, there is the possibility that energy will not conserved and the approximation error will be large due to the radius becoming large in this solution. Furthermore, because the distance between the light source and the shading point exists in the denominator in the rendering equation after the approximation, there are cases in which a spike-form artifact still appears in the rendering result.

Meanwhile, in an approach proposed in Kun Xu et al., "A Practical Algorithm for Rendering Interreflections with All-frequency BRDFs", ACM Transactions on Graphics, Vol. 33 Number. 1, pp. 10:1-10-16, January, 2014, an SG approximation is performing for a cone formed by a shading point and a light source (a virtual spherical light source) considering the conservation law of energy, but when the distance between the light source and the shading point is short, avoiding the occurrence of a spike-form artifact is impossible, and so different approaches are used in accordance with the distance.

SUMMARY OF THE INVENTION

The present invention was made in view of such problems in the conventional technique. The present invention provides a storage medium, an information processing apparatus, and a calculation method for realizing a suitable rendering expression for radiance that reduces the occurrence of spike-form artifacts.

The present invention in its first aspect provides a non-transitory computer-readable storage medium storing a program that causes one or more computers for calculating a radiance at a shading point in a 3D scene to execute: processing for obtaining a light emission radiance of a target light source expressed by a spherical Gaussian (SG expressed); processing for approximating by a spherical Gaussian (SG approximating) a function that indicates a spread of the target light source from a perspective of the shading point; processing for obtaining an incident radiance at the shading point by obtaining a product of the SG expressed light emission radiance of the target light source and the SG approximated function that indicates the spread of the target light source; processing for SG approximating a bidirectional reflection distribution function (BRDF) at the shading point; and processing for calculating the radiance at the shading point based on information indicating a viewpoint at which the shading point is to be rendered, the incident radiance at the shading point and the SG approximated BRDF at the shading point.

The present invention in its second aspect provides an information processing apparatus that calculates a radiance at a shading point in a 3D scene, the apparatus comprising: an obtainer which is able to obtain a light emission radiance of a target light source expressed by a spherical Gaussian (SG expressed); a first approximator which is able to approximate by a spherical Gaussian (SG approximating) a function that indicates a spread of the target light source from a perspective of the shading point; a first calculator which is able to calculate an incident radiance at the shading point by obtaining a product of the SG expressed light emission radiance of the target light source obtained by the obtainer and the function that indicates the spread of the target light source that is SG approximated by the first approximator; a second approximator which is able to SG approximate a bidirectional reflection distribution function (BRDF) at the shading point; and a second calculator which is able to calculate the radiance at the shading point based on information indicating a viewpoint at which the shading point is to be rendered, the incident radiance at the shading point obtained by the first calculator and the BRDF at the shading point that is SG approximated by the second approximator.

The present invention in its third aspect provides a calculation method for a radiance at a shading point in a 3D scene, the method comprising: an obtaining step of obtaining a light emission radiance of a target light source expressed by a spherical Gaussian (SG expressed); a first approximation step of approximating by a spherical Gaussian (SG approximating) a function that indicates a spread of the target light source from a perspective of the shading point; a first calculation step of obtaining an incident radiance at the shading point by obtaining a product of the SG approximated light emission radiance of the target light source obtained by the obtaining step and the function that indicates the spread of the target light source that is SG approximated in the first approximation step; a second approximation step of SG approximating a bidirectional reflection distribution function (BRDF) at the shading point; and a second calculation step of calculating the radiance at the shading point based on information indicating a viewpoint at which the shading point is to be rendered, the incident radiance at the shading point obtained in the first calculation step and the BRDF at the shading point that is SG approximated in the second approximation step.

Further features of the present invention will become apparent from the following description of exemplary embodiments (with reference to the attached drawings).

DESCRIPTION OF THE EMBODIMENTS

First Embodiment

Exemplary embodiments of the present invention will be described hereinafter in detail, with reference to the accompanying drawings. Note that the embodiments explained below explain an example in which the present invention is applied to a PC which is capable of generating computer graphics (CG) images in which radiance at a shading point is reflecting in a 3D scene, the PC being an example of an information processing apparatus. However, the present invention is applicable to any device capable of calculating a radiance at a shading point in a 3D scene.

Also, it is assumed that "a shading point", in the specification, indicates a point, in a rendering of a rendering object, which corresponds to the point, at which a luminance component (radiance) that the object emitted toward a viewpoint is obtained. Also, it is assumed that "a light emission radiance" indicates a radiance determined in advance by a scene designer, or the like, which a light source defined in the 3D scene provides for the scene, and "an incident radiance" indicates a radiance that is emitted from the light source and is incident on a shading point. Also, it is assumed that when simply "radiance" is expressed, it is indicating a radiance that a shading point presents towards a viewpoint according to a CG image that is to be rendered.

Configuration of a PC 100

Figure 1:
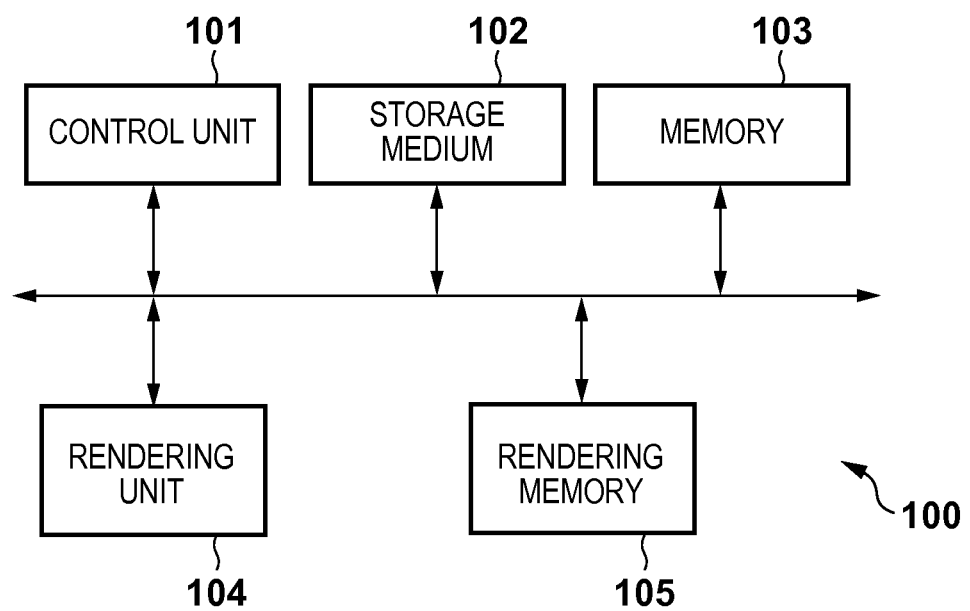
FIG. 1 is a block diagram for illustrating a functional configuration of a PC 100 corresponding to embodiments and variations of the present invention.

FIG. 1 is a block diagram for showing a functional configuration of the PC 100 according to embodiments of the present invention.

A control unit 101 controls operation of each block that the PC 100 comprises, and may be a CPU, for example. More specifically, the control unit 101 reads operation programs for blocks stored in a storage medium 102, loads the operation programs into a memory 103, and executes the operation programs, thereby controlling the operation of each block.

The storage medium 102 is a storage apparatus such as a non-volatile memory, an HDD, or the like. The storage medium 102 stores parameters necessary in the operation of each block in addition to the operation programs of the blocks that the PC 100 comprises. Also, the storage medium 102 stores various data of rendering objects arranged in a 3D scene (target scene) which is a target of generation in the rendering processing which is described later. Also, the memory 103 is a volatile memory such as a RAM. The memory 103 stores intermediate data output in the operation of the blocks in addition to being a loading region for the operation programs of the blocks.

A rendering unit 104 is, for example, a rendering apparatus such as a GPU, or the like. The rendering unit 104 performs processing such as a translation, a rotation, or the like, based on predetermined parameters, and executes rendering processing by which a target scene is rendered in accordance with information of a viewpoint that is set (a position, a direction, an angle of view, an upward direction, or the like) on data of a rendering object that is loaded into a rendering memory 105, for example, and thereby generates a CG image. The PC 100 of the present embodiment executes later described radiance calculation processing for calculating a radiance that occurs due to a light source corresponding to a direct light arranged in a target scene for at least a part of a rendering object in rendering processing.

Radiance Calculation Processing

Figure 2:
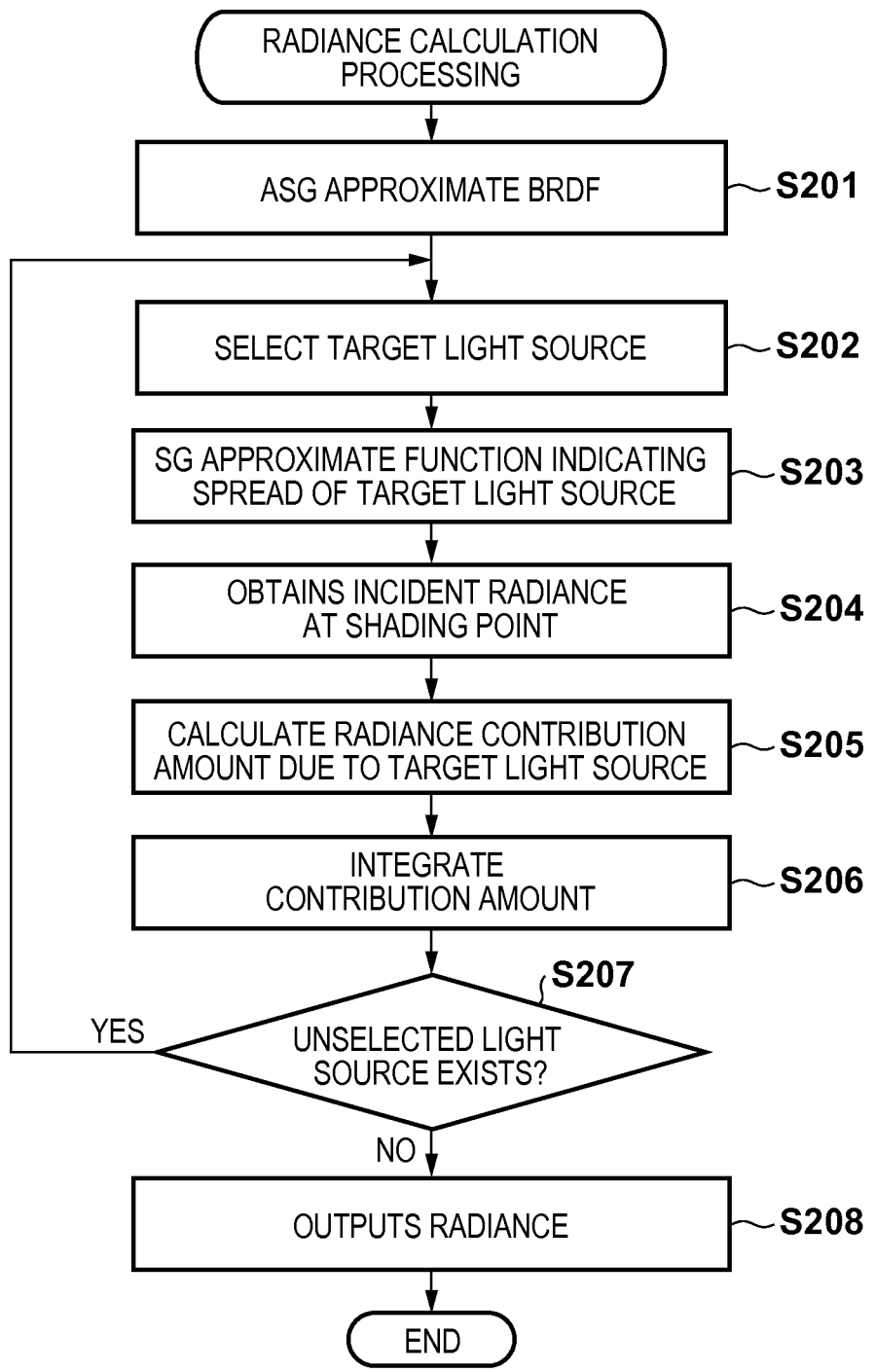
FIG. 2 is a flowchart for exemplifying radiance calculation processing is executed on the PC 100 according to a first embodiment of the present invention.

Specific processing for the radiance calculation processing executed in the PC 100 of the present embodiment having this kind of configuration will be explained using the flowchart of FIG. 2. The processing corresponding to this flowchart can be realized by the control unit 101 reading a corresponding processing program stored in the storage medium 102, for example, loading the processing program into the memory 103, and executing the processing program. Note that the radiance calculation processing is explained as something that is executed for each shading point for which the radiance calculation is performed at a predetermined timing of the rendering processing, for example. Also, in the present embodiment, for convenience, explanation is given having the agent of the calculation in the radiance calculation processing be the control unit 101, but the implementation of the present invention is not limited to this. In other words, because radiance that occurs due to a plurality of light sources is calculated for each of a plurality of shading points, it should be easily understood that the rendering unit 104, which excels at concurrent calculation, may execute at least a part of the radiance calculation processing.

In step S201, the control unit 101 approximates to an anisotropic spherical Gaussian (ASG approximation) a bidirectional reflection distribution function (BRDF) at a shading point. The anisotropic spherical Gaussian is an approximation method that is proposed by Xu et al. for reducing a computation cost when performing an illumination calculation for a light source comprising a spread by using a Monte Carlo method (Kun Xu et al., "Anisotropic Spherical Gaussians", ACM Transactions on Graphics, Vol. 32 Number. 6, pp. 209:1-209:11, November, 2013). The BRDF may be approximated by a spherical Gaussian, but because a lobe of a reflection is an anisotropic distribution even with an isotropic BRDF, an ASG approximation is performed for the BRDF of the shading point in the present embodiment. When the ASG approximation is used, the calculation becomes more complex than when an SG approximation is used, but a calculation result which has a higher level of reproduction can be obtained.

Note that in the present embodiment explanation is given for using an anisotropic spherical Gaussian for only a BRDF approximation at a shading point considering an increase in the calculation amount, but the implementation of the present invention is not limited to this. In embodiments of the present invention, while various parameters are approximated to a spherical Gaussian as will be explained later, it may be freely selected whether to make the spherical Gaussian in the approximation to be isotropic or anisotropic based on desired calculation time, calculation amount, and reproduction precision. Also, the ASG approximation and the SG approximation are not limited to the schemes using analytical approximation indicated by Wang and Xu, and other approaches such as fitting may be used.

In step S202, the control unit 101 selects a light source, for which the contribution amount of the light source to the radiance in the shading point is not calculated yet, to be a target light source from out of the light sources corresponding to the direct light defined within the target scene. In the present embodiment, for simplicity, explanation is given having the a directional distribution of a light emission radiance of the light source corresponding to direct light that is the target of the radiance calculation processing be expressed (SG expression) by a spherical Gaussian in advance. In other words, the light emission radiance of the light source corresponding to a direct light defined in the target scene $$L_{em}(-\omega) = \mu_{em} G(\omega, \xi_{em}, \eta_{em}) \cdot G(\omega, \xi_{em}, \eta_{em}) = \exp(\eta_{em}((\omega \cdot \xi_{em}) - 1))$$

may be defined by various parameters of the spherical Gaussian defined by the scene designer that designed the target scene (the amplitude $\mu_{em}$ (spread) of the spherical Gaussian, a center vector $\xi_{em}$ of light emission, a sharpness $\eta_{em}$), and a vector $\omega$ for all light beams emitted from the target light source, for example. Note that a target light source that has been SG expressed need not show a distribution having a directional bias, and may include a uniform distribution. For example, in a case where the target light source is of a uniform distribution in regards to directionality, the light emission radiance can be SG expressed as sharpness $\eta_{em} = 0$.

Note that in the invention according to the present embodiment, the light source corresponding to the direct light that is the target of the application need not be something for which light emission radiance is SG expressed in advance. In the invention according to the present embodiment, the light source corresponding to the direct light that is the target of the application may be a light source that has a spread as with Spherical Light, and may be a light source that can be approximated with a spherical Gaussian (SG approximation) such as a light source that has directionality, such as a spotlight. In such a case, the light emission radiance may be SG approximated by performing processing such as fitting a distribution of a light bundle emitted from a target light source by a least-square method, or the like.

In step S203, the control unit 101 SG approximates a function $L_c(x, \omega)$ (x is a vector that indicates a shading point) that indicates the spread of the target light source from the perspective of the shading point. As described above, in the invention according to the present embodiment because the light source that is the target of the application has a spread, the spread which has the shading point as a basis can be indicated by a function. For example, when the target light source is Spherical Light, the spread of the target light source from the perspective of the shading point is a function that indicates a shape of a cone defined by the shading point and Spherical Light. If it is assumed that the function indicating the spread of the target light source, by the SG approximation, can be represented by $$L_c(x, \omega) \approx \mu_c G(\omega, \xi_c, \eta_c) \quad (1)$$

then because it is necessary to conserve the energy in the cone $$\int_{s^2} L_c(\omega') d\omega' = \int_{s^2} \mu_c G(\omega', \xi_c, \eta_c) d\omega'$$

is established, and accordingly an amplitude $\mu_c$ of the spherical Gaussian can be obtained with $$\mu_c = \frac{\int_{s^2} L_c(\omega') d\omega'}{\int_{s^2} G(\omega', \xi_c, \eta_c) d\omega'}$$

Figure 3:
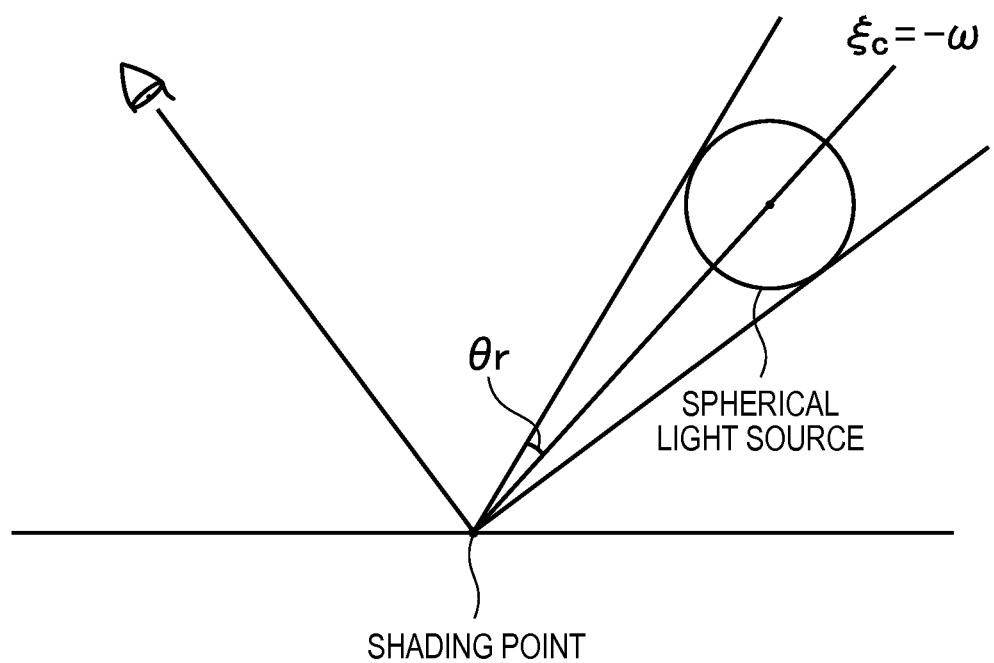
FIG. 3 is a view for explaining a spread of a target light source from the perspective of a shading point according to embodiments of the present invention.

Note that $\xi_c$ is a vector that defines a rotation shaft of the cone, is shown in FIG. 3, i.e. an inverse vector of the vector directed from the center of Spherical Light toward the shading point, and when the inclination (spread: an angle formed between the rotation shaft and the generatrix of the cone) of the cone from the perspective of the shading point is $\theta_r$, $$\int_{s^2} L_c(\omega') d\omega' = 2\pi(1 - \cos\theta_r)$$

is established, and thus Equation 1 becomes $$L_c(x, \omega) \approx \mu_c G(\omega, \xi_c, \eta_c) = \frac{\eta_c(1 - \cos\theta_r)}{1 - \exp(-2\eta_c)} G(\omega, \xi_c, \eta_c)$$

$L_c(x,\omega)$ which is obtained in this way is a function that indicates 1 if the light beam of the selected vector $\omega$ is included in the cone, and indicates 0 if it is not included.

Note that because parameters for which setting is necessary in accordance with a scene indicated by the above described by Wang et al. are excluded, if a sharpness $\eta_c$ of the function that indicates the cone expresses the sharpness by a first order function, then $$\eta_c = g(\cos\theta_r),$$

and thus using the least-square method $$\eta_c = \min_{\eta'} \int_{S^2} \left( L_c(\omega') - \frac{\eta'(1-\cos\theta_r)}{1-\exp(-2\eta')} G(\omega', \xi_c, \eta') \right)^2 d\omega'$$

may be calculated in advance as an optimal solution. In addition, determination may be made using a one-dimensional LUT, or by using the following rational approximation expression obtained experimentally $$\eta_c = g(\cos\theta_r) \approx \frac{1.23090213405182 + 0.191696026189420 \cos\theta_r}{1-\cos\theta_r}$$

In step S204, the control unit 101 obtains the incident radiance $L_{in}(x,\omega)$ at the shading point. The incident radiance image is to be rendered. The control unit 101 calculates the contribution amount due to the target light source in the radiance at the shading point by the product of the SG approximated incident radiance and the SG approximated BRDF at shading point.

In other words, the processing in this step is equivalent to solving the rendering equation for calculating the radiance at the shading point for the viewpoint for which rendering is performed due to all light beams emitted from the target light source. In other words, by using the SG approximation or the ASG approximation, the rendering equation for the shading point ($\omega_{eye}$ is a vector directed towards the viewpoint for which rendering is performed from the shading point, and n is the normal vector at the shading point).

Regarding $$L(x, \omega_{eye}) = \int_{S^2} L_{in}(x, \omega) f(x, \omega_{eye}, \omega)(n\cdot\omega) d\omega \qquad (2)$$

in a case where the ASG approximation of the BRDF at the shading point is $$f(x,\omega_{eye},\omega) \approx G_a(\omega,[\xi_x,\xi_y,\xi_z],\eta_x,\eta_y)$$

Equation 2, by using Xu et al.'s ASG approximation method, is $$L(x, \omega_{eye}) = \int_{S^2} L_{in}(x, \omega) f(x, \omega_{eye}, \omega)(n\cdot\omega) d\omega$$

$$\approx \int_{S^2} \mu_{in} G\left(\omega, \frac{\xi_m}{\|\xi_m\|}, \|\xi_m\|\right) \mu_a G_a(\omega, [\xi_x, \xi_y, \xi_z], \eta_x, \eta_y) d\omega$$

$$\approx \frac{2\pi\mu_{in}\mu_a}{\sqrt{(2\eta_x + \|\xi_m\|)(2\eta_y + \|\xi_m\|)}} G_a\left(\frac{\xi_m}{\|\xi_m\|}, [\xi_x, \xi_y, \xi_z], \frac{\eta_x \|\xi_m\|}{2\eta_x + \|\xi_m\|}, \frac{\eta_y \|\xi_m\|}{2\eta_y + \|\xi_m\|}\right)$$

$$\because \mu_a = n\cdot\omega, \eta = 2v (v \text{ is disclosed in } Xu)$$

$L_{in}(x,\omega)$ at the shading point is calculated by a product of the SG expressed light emission radiance and the function $L_c(x,\omega)$ which indicates the spread of the target light source from the perspective of the SG approximated shading point. In other words, because these are both expressed using spherical Gaussians, the incident radiance $L_{in}(x,\omega)$ can be calculated as follows.

$$L_{in}(x, \omega) = L_c(x, \omega) L_{em}(-\omega)$$

$$\approx \mu_c G(\omega, \xi_c, \eta_c) \mu_{em} G(\omega, \xi_{em}, \eta_{em})$$

$$= \mu_{in} G\left(\omega, \frac{\xi_m}{\|\xi_m\|}, \|\xi_m\|\right)$$

$$\because \xi_m = \eta_c \xi_c + \eta_{em}\xi_{em}, \mu_{in} = \mu_c \mu_{em} \exp(\|\xi_m\| - \eta_c - \eta_{em})$$

Additionally, because the light emission radiance and the function that indicates the spread of the target light source are both represented by spherical Gaussians in this step, it is also possible to express the obtained incident radiance by a spherical Gaussian.

In step S205, the control unit 101 calculates the contribution amount due to the target light source in the radiance at the shading point towards the viewpoint for which the CG and the solution can be obtained analytically. Note that in the ASG approximation method by Xu et al. described above, the sharpness of the ASG approximated BRDF is defined as v, but in the approach of the present embodiment the sharpness of the ASG approximated BRDF is indicated by $\eta$, and thus the relation equation is as described above.

In step S206, the control unit 101 integrates the contribution amount of the radiance corresponding to the target light source calculated in step S205 into a radiance value for the shading point which is stored in the memory 103, for example.

In step S207, the control unit 101 determines whether or not an unselected light source exists for the target light source in the light sources corresponding to direct light defined in the target scene. The control unit 101 returns the processing to step S202 when it determines that an unselected light source exists. Also, the control unit 101, in a case where it determines that an unselected light source does not exist, outputs, in step S208, the radiance value for the shading point for which the accumulation of contribution amounts due to the light sources has completed, and it terminates the radiance calculation processing.

In other words, because loop processing in the radiance calculation processing calculates radiance from the shading point towards the viewpoint for which rendering is performed due to one or more light sources corresponding to direct light defined in the target scene, this is equivalent to performing a summation calculation for contribution amounts due to each light source. With this, it is possible to calculate the radiance at a shading point for which the occurrence of spike-form artifacts is reduced excluding parameters for which tuning is necessary for each light source depending on the scene by an artist, or the like, and the distance between the light source and the shading point.

As explained above, by virtue of the information processing apparatus of the present embodiment, it is possible to realize a suitable rendering expression of radiance that reduces spike-form artifacts. The information processing apparatus obtains the incident radiance at the shading point by obtaining the light emission radiance of a target light source expressed by a spherical Gaussian (SG expressed), approximating by a spherical Gaussian (SG approximation) a function indicating the spread of the target light source from the perspective of the shading point, and obtaining the product of these. Also, the apparatus SG approximates a bidirectional reflection distribution function (BRDF) at a shading point, and calculates the radiance at the shading point based on information indicating the viewpoint for which the shading point is to be rendered, an incident radiance at the shading point, and the SG approximated BRDF at the shading point.

Second Embodiment

In the above described first embodiment, explanation was given for obtaining the radiance for a shading point due only to light sources corresponding to direct light existing in the target scene, but the implementation of the present invention is not limited to this. In other words, the present invention is also applicable when considering virtual light sources corresponding to indirect light that occurs due to a light beam being emitted from a light source corresponding to direct light being reflected by a predetermined rendering object existing in the target scene such as is considered in photon tracing or reflective shadow map generation.

Note that unlike with direct light for which various parameters are defined by an artist, or the like, with indirect light the calculation is performed in accordance with physics, such as energy conservation, and thus the approach of Wang et al. cannot be applied for a light source corresponding to indirect light which is considered in the present embodiment. Below, explanation will be given for an approach for reducing the occurrence of spike-form artifacts by excluding the distance between the light source and the shading point by using an SG approximation similarly to in the first embodiment for a light source corresponding to indirect light.

Also, in the present embodiment, because explanation is given for an example in which the present invention is applied to the PC 100, which has the same configuration as in the above described first embodiment, the explanation corresponding to the functional configuration of the PC 100 will be omitted.

Radiance Calculation Processing

Figure 4:
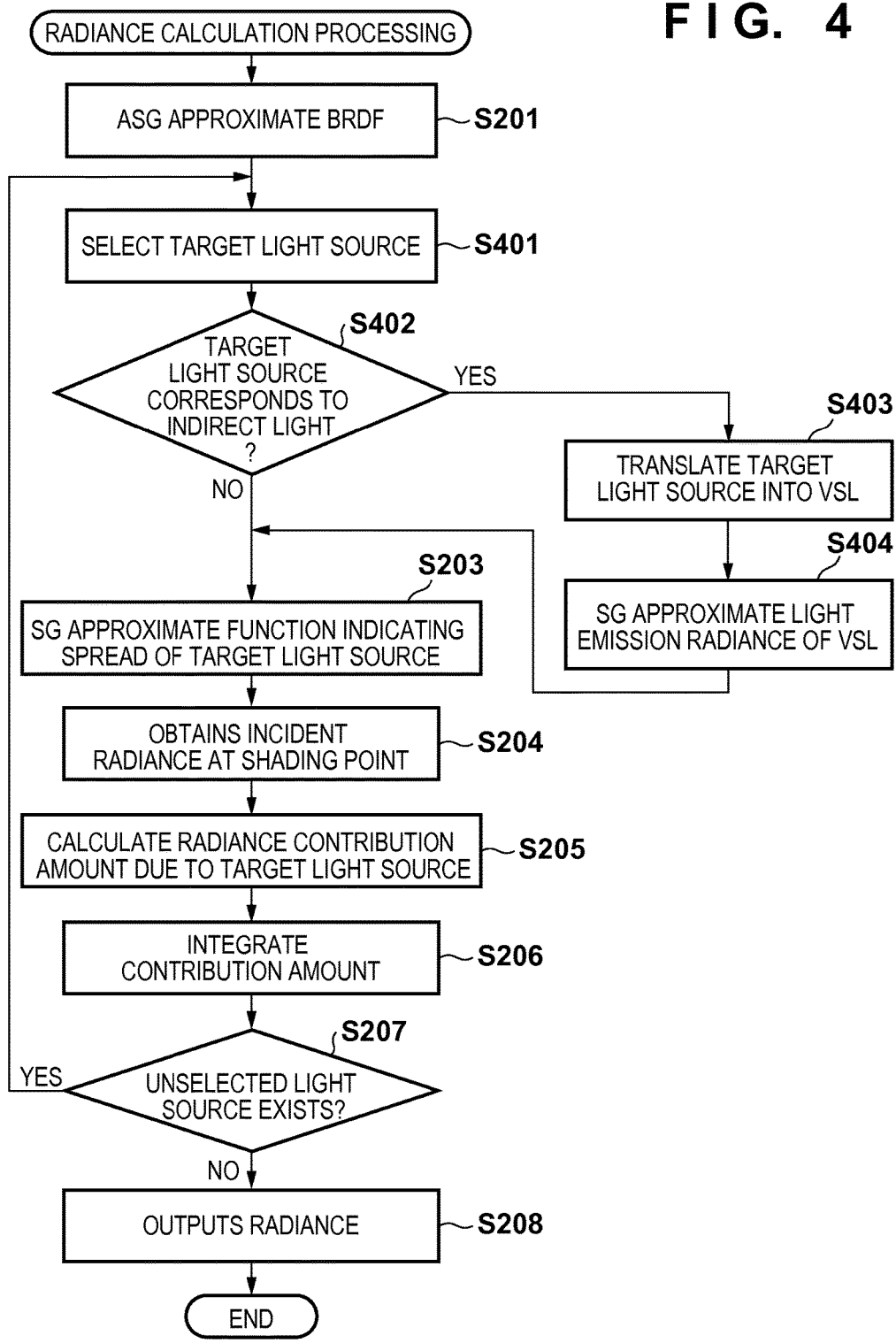
FIG. 4 is a flowchart for exemplifying radiance calculation processing is executed on the PC 100 according to a second embodiment of the present invention.

Below, detailed explanation will be given with reference to FIG. 4 for the radiance calculation processing of the present embodiment. Note that in the radiance calculation processing, for steps that perform similar processing to that of the radiance calculation processing of the above described first embodiment, the same reference numerals are given, and explanation of these is omitted, and the following explanation will be limited to the characteristic steps in the present embodiment. Note that explanation is given having a light source corresponding to indirect light in the following explanation be defined by randomly sampling virtual point light (VPL) defined by 1 bounce in order to simplify the calculation considering real-time rendering, but it goes without saying that configuration may be taken such that the light sources corresponding to indirect light to be considered in embodiments of the present invention be defined by a plurality bounces. Also, a light source corresponding to indirect light in the present embodiment is assumed to be a VPL defined by photon tracing, and this is explained as something that is used having been translated into a virtual spherical light source (VSL) as is proposed by Hasan et al., for example, (Milos Hasan et al., "Virtual Spherical Lights for Many-Light Rendering of Glossy Scenes", ACM Transactions on Graphics, Vol. 28 Number. 5, pp. 143:1-143:6, December, 2009). However, because embodiments of the present invention omit later explained translation processing the conversion processing, configuration may be taken such that this is defined in advance as Virtual Area Light (VAL), for example, which has a spread and is proposed by Wallace et al. instead of VSL (John R Wallace et al., "A Ray Tracing Algorithm for Progressive Radiosity", ACM SIGGRAPH Computer Graphics—Special issue: Proceedings of the 1989 ACM SIGGRAPH conference, Volume 23 Issue 3, pp. 315-324, July, 1989).

In step S201, after ASG approximating the BRDF at the shading point, the control unit 101, in step S401, selects for the target light source 1 light source for which the contribution amount of the light source is not calculated for the radiance at the shading point from out of the light sources defined in the target scene.

In step S402, the control unit 101 determines whether or not the target light source is a light source corresponding to indirect light. In other words, the control unit 101 determines whether or not the target light source is a VPL. The control unit 101 moves the processing to step S403 in cases where it determines that the target light source is a light source that corresponds to indirect light, and moves the processing to step S203 in cases where it determines that the target light source is a light source that corresponds to direct light. Note that because it is assumed that both light sources corresponding to direct light and light sources corresponding to indirect light are included in the target light sources in the present embodiment, and while it is determined which type the target light source is as in this step, it should be easily understood that configuration may be taken such that the later described processing of step S403 and step S404 be performed without performing the processing of this step when it is ascertained in advance that the target light source is a light source corresponding to an indirect light.

In step S403, the control unit 101 translates the target light source into a VSL. In a translation from the VPL to the VSL, the translation to the VSL is performed by defining the center of the VPL as the center position of the VSL, for example, and defining a reciprocal of the density of the VPL as the radius. When it is assumed that the light source corresponding to indirect light is for 1 bounce, the radius $r_{em}$ can be obtained analytically by using the relationship $$\pi r_{em}^2 \propto \frac{\| x_0 - x_{em} \|^2}{Np(\omega_{orig})(n_{em} \cdot (-\omega_{orig}))}$$

where the light beam sample number is N, the probability density of the light beams is p, a position vector of a direct light source which is the cause of the indirect light is $x_0$, a position vector of the coordinates (the center coordinates of the VSL) of the VPL is $x_{em}$, a vector directed from the direct light source which is the cause of the indirect light toward the VPL is $\omega_{orig}$, and the normal vector at the VPL position is $n_{em}$. In other words, explanation is given having the light source corresponding to direct light be a point light source that does not have a spread since it is not necessary that the direct light source that is the cause of the indirect light be a light source having a spread, as in the first embodiment, because in the radiance calculation processing of the present embodiment, the light source corresponding to indirect light is translated into a light source having a spread. Note that when the photon bounces a plurality of times, and when it is emitted from a large light source having a spread, the above described analytical solution cannot be used, and thus configuration may be taken to use a scheme for obtaining the radius by a density estimation such as that proposed by Hasen et al.

Note that in the present embodiment explanation is given having the analytical solution be used as the radius of the VSL into which the VPL is translated, but the implementation of the present invention is not limited to this. In other words, when each light source corresponding to indirect light, for which a VPL defined by the randomly sampling is translated into a VSL, is handled, and the radius of the VSL is determined to be the analytical solution, an error will become large because the distribution of the VPLs that are actually generated is being ignored even though the probability density is considered, and there is the possibility that an unnatural radiance will be reproduced. In this respect, Prutkin et al. propose an approach for classifying (clustering) into collections by closeness of the VPL position, the level of similarity to the normal at the VPL position, the color of the rendering object at the VPL position, or the like, as the type of the VPL defined by the randomly sampling, and determining the radius of the VSL so as to not duplicate in a collection (Roman Prutkin et al., "Reflective Shadow Map Clustering for Real-Time Global Illumination", Eurographics 2012 Short Papers, pp. 9-12, March, 2012), and the processing of this step may be performed using this approach.

In step S404, the control unit 101 obtains the light emission radiance $L_{in}(-\omega)$ of the translated VSL, and performs the SG approximation. Because the light emission radiance of the VSL changes in accordance with the BRDF of the object at the target light source position, the normal direction, or the like, when the SG approximation of the BRDF is made to be $$f(x_{em}, -\omega, -\omega_{orig}) \approx \mu_f G(-\omega, \xi_f, \eta_f),$$

it can be obtained as $$L_{em}(-\omega) = \frac{\Phi_{em}}{\pi r_{em}^2} f(x_{em}, -\omega, -\omega_{orig})(n_{em} \cdot (-\omega))$$

$$\approx \frac{\Phi_{em}}{\pi r_{em}^2} (n_{em} \cdot (-\omega)) \mu_f G(-\omega, \xi_f, \eta_f)$$

$$= \mu_{em} G(\omega, \xi_{em}, \eta_{em})$$

$$\therefore \mu_{em} = \frac{\Phi_{em}}{\pi r_{em}^2} (n_{em} \cdot (-\omega)) \mu_f, \xi_{em} = -\xi_f, \eta_{em} = \eta_f$$

Note that $\Phi_{em}$ is the power (energy) of the photon that is incident on the position of the VPL. After obtaining the SG approximated light emission radiance of the VSL, the control unit 101 moves the processing to step S203. The processing after step S203 can be processed similarly to when the target light source is a light source corresponding to direct light.

With such a configuration, it is possible to calculate the radiance at a shading point while excluding the distance between the light source and the shading point similarly to in the first embodiment by similarly SG approximating the light emission radiance for the light source defined as indirect light in the radiance calculation processing of the present embodiment. In other words, it is possible suitably calculate the radiance at the shading point having considered indirect light that occurred due to a direct light, without being limited to direct light existing in the target scene.

First Variation

When reproducing indirect light due to a surface indicating a sharp specular reflection in a specific direction, in a case where the VPLs are sampled discretely, for example, each VPL arranged on the surface is strongly emitted in a direction in accordance with the positional relationship between the VPL and the light source. In other words, because the VPLs are arranged discretely on the surface, and each has a different reflection direction, spot artifacts, such as when a range that is irradiated by light being emitted from one light source and reflected by the surface becoming bright discretely but having gaps, will be caused.

Figure 5A:
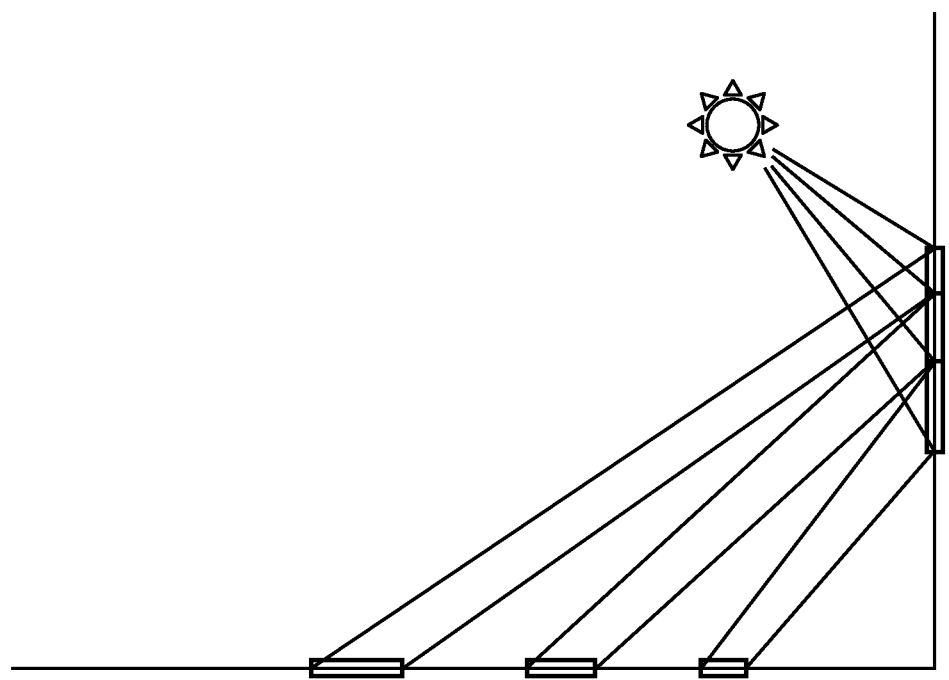
FIGS. 5A and 5B are views for explaining a flicker phenomenon of an indirect light due to a clustering according to a variation of the present invention.

In contrast to this, because it is possible to perform an expression by causing the reflected light to have a spread by performing a VSL translation such as in the second embodiment, and the occurrence of spot artifacts that are due to sharp specular reflections are reduced somewhat. However, because a reflection due to a VSL is emitted strongly in a direction corresponding to a positional relationship between its center and a light source, even if each VSL is dense as shown in FIG. 5A, for example, spot artifacts may occur.

In the variation, explanation will be given for an approach for further reducing this kind of spot artifact. Note that, in the variation, because explanation is given for an example in which the present invention is applied to the PC 100, which has the same configuration as in the above described first embodiment, the explanation corresponding to the functional configuration of the PC 100 will be omitted.

Radiance Calculation Processing

Figure 6:
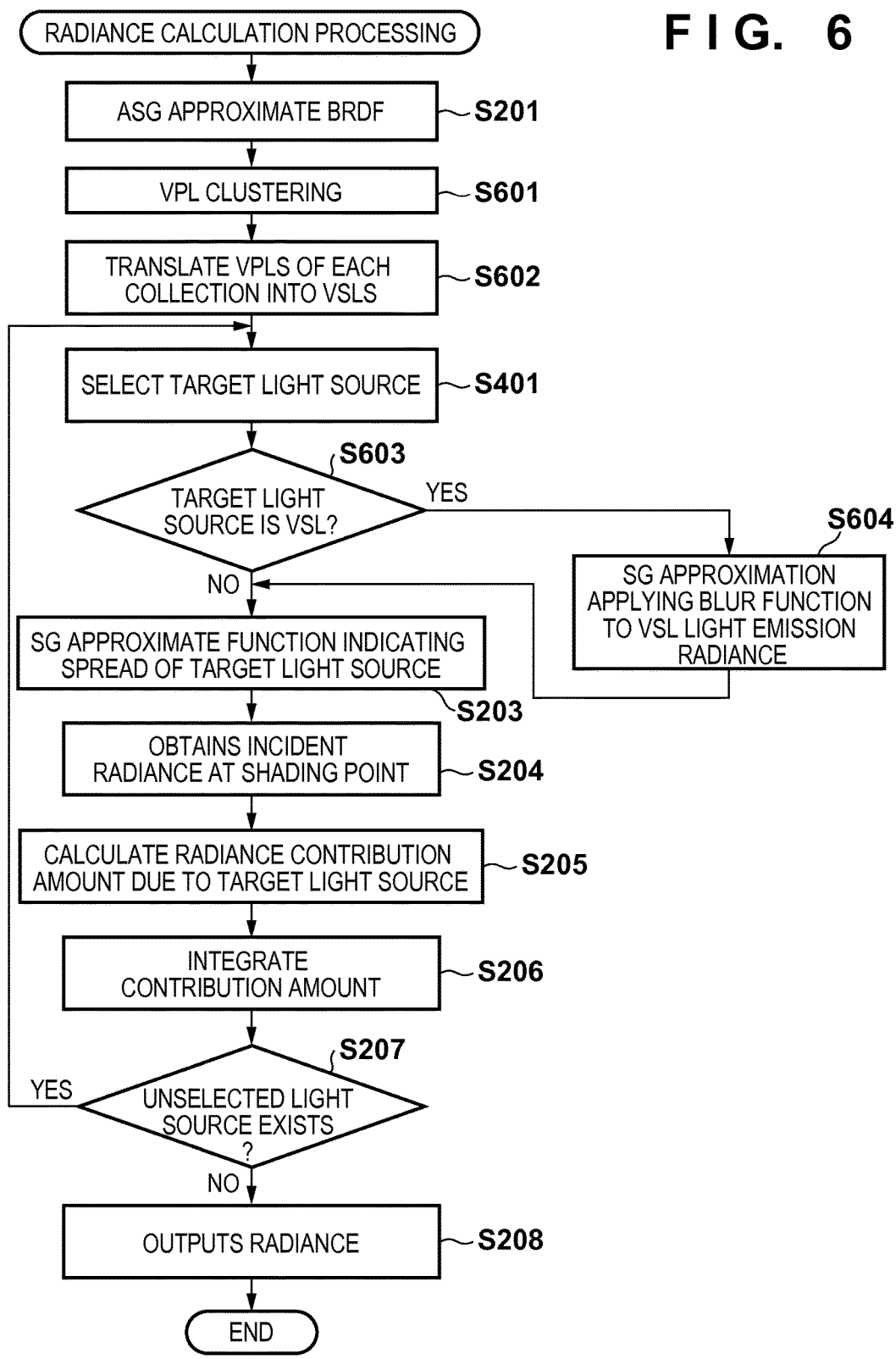
FIG. 6 is a flowchart for exemplifying radiance calculation processing which is executed on the PC 100 in accordance with a variation of the present invention.

Below, detailed explanation will be given with reference to FIG. 6 for the radiance calculation processing of the variation. Note that in the radiance calculation processing, for steps that perform similar processing to that of the radiance calculation processing of the above described first and embodiments, the same reference numerals are given, and explanation of these is omitted, and the following explanation will be limited to the characteristic steps in the present embodiment. Also, in the explanation of the radiance calculation processing, it is assumed that the light source (VPL) corresponding to the indirect light only bounces 1 time for simplicity, and VPLs included in the same collection by clustering have identical normals, color, BRDF, or the like.

In step S201, after the BRDF at the shading point is ASG approximated, the control unit 101, in step S601, performs processing for clustering the light sources (VPLs) corresponding to the indirect light defined in the target scene. The clustering of the variation is explained as something that is performed by the above described selection criteria, but the selection criteria for determining which VPLs are included by the clustering in the same collection are not limited to these in embodiments of the present invention. Also, explanation is given having clustering be used in the present embodiment, but it goes without saying that the present invention is applicable even when the radius $r_{em}$ is obtained analytically as explained in the second embodiment.

In step S602, the control unit 101 translates the VPLs in each collection classified by the clustering into VSLs. At this time, rather than determining the radius of each VSL to be the above described analytical solution, it is assumed that the control unit 101 actually measures which VPL in a cluster is the furthest from the perspective of the center, for example, and the dispersion in the positions of the VPLs, and thereby determines the radius of each VSL such that as much as possible duplications do not occur. The control unit 101, after translating all of the VPLs in the collections into VSLs, moves the processing to step S401.

In step S401, when the target light source is selected, the control unit 101, in step S603, determines whether or not the target light source is a light source corresponding to indirect light. Note that the determination as to whether or not the light source corresponds to indirect light in this step is a determination as to whether or not the target light source is a VSL because all of the VPLs are translated into VSLs in step S602. The control unit 101 moves the processing to step S604 in cases where it determines that the target light source is a light source that corresponds to indirect light, and moves the processing to step S203 in cases where it determines that the target light source is a light source that corresponds to direct light.

Figure 5B:
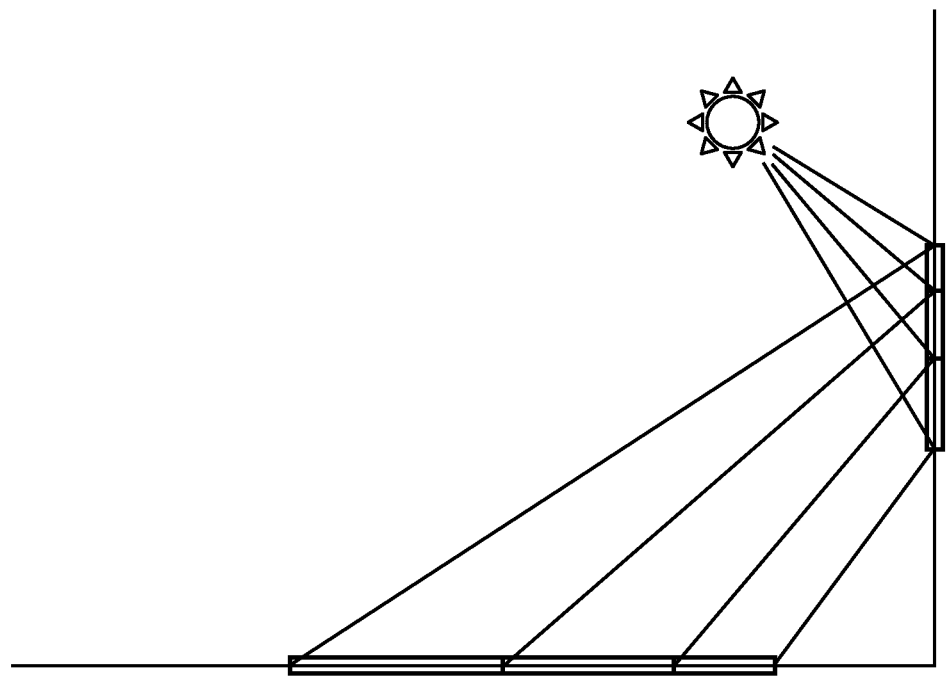

In step S604, the control unit 101 obtains the light emission radiance $L_{in}(-\omega)$ of the VSL which is the target light source, and performs the SG approximation. At this time, the control unit 101 performs processing (blur processing) for applying a blur effect to the BRDF such that the range irradiated in accordance with the radius of the VSL, i.e. in accordance with the thickness of the cone defined by the shading point and the VSL is extended so that gaps in the range that is irradiated as is shown in FIG. 5A do not occur due to discretization of the virtual light source. In this way, by extending the range irradiated by the blur processing in accordance with the thickness of the cone, it is possible to reproduce the indirect light suitably as shown in FIG. 5B.

Note that in a case where the light emission radiance of the VSL is defined by performing blur processing for the BRDF in this way, the light emission radiance, by SG approximating the blur function, can obtain a solution analytically as $$\int_{S^2} f(x_{em}, -\omega', -\omega)(n_{em} \cdot (-\omega))B_{em}(\omega')d\omega'$$

$$\approx \int_{S^2} \mu_f G(\omega', \omega, \eta_f)\mu_b G(\omega', \xi_{orig}, \eta_b)d\omega'$$

$$\approx \frac{2\pi\mu_f\mu_b}{\eta_f + \eta_b} G\left(\omega, \xi_{orig}, \frac{\eta_f\eta_b}{\eta_f + \eta_b}\right)$$

$$\because \eta_b = g(\cos\theta_b), \mu_b = \frac{1}{\int_{S^2} G(\omega', \xi_{orig}, \eta_b)d\omega'}$$

Here, $B_{em}(\omega')$ is the blur function, $\xi_{orig}$ is a vector that indicates the axis of the cone formed by the VSL and the light source corresponding to the direct light which is the cause of the indirect light, and $\mu_b$ and $\eta_b$ respectively indicate the amplitude and the sharpness when SG approximating the cone. Accordingly, the contribution amount of the target light source in the radiance at the shading point obtained in step S205 may be calculated using this.

Note that explanation was given for an approach for reproducing indirect light suitably by performing blur processing in the present embodiment, but spot artifacts in a case where clustering is performed can be solved by an approach for approximating a lobe where a plurality of lobes of the VSLs in the clustering are averaged by applying an averaging principle in Phong Distribution by Toksvig (Michael Toksvig, "Mipmapping Normal Maps", http://www.nvidia.com/object/mipmapping_normal_maps.htm 1), is averaging after approximating an SG approximated BRDF to Phong, and once again returning to SG from the phone. Alternatively, averaging of the lobe of the reflection may be performed using an approach by Laurijissen et al. (Jurgen Laurijissen et al., "Fast Estimation and Rendering of Indirect Highlights", Computer Graphics Forum, Volume 29 Number 4, pp. 1305-1313, June, 2010).

Second Variation

The above described first and second embodiments, and in the first variation, explanation was given for approaches for realizing a suitable rendering expression of a radiance that reduces spike-form artifacts while reducing the calculation amount, considering mainly real-time rendering. However, in fields in which there is no constraint on the time by which the calculation should be completed, such as is the case in real-time rendering, where there is no temporal constraint but the rendering reproduction precision is considered important (as with offline rendering), there is the possibility that a desired precision cannot be realized by the above described schemes using SG and ASG approximation on the BRDF. This is due to the fact that even when the SG and ASG approximations using the Spherical Warping approach of Wang et al. cause the number of SGs and ASGs used in the approximation to increase, and the error does not converge. In other words, there is a possibility that on top of the error not converging, the level of reproduction will not improve even if time is taken in offline rendering.

Meanwhile, in a case where there are less stringent constraints on the calculation amount and the calculation time as in offline rendering, it is possible to perform more photon tracing than in real-time rendering, i.e. it is possible to consider calculation of more VSLs. In other words, it is possible to reduce the radius of each VSL defined for a single shading point, and the sharpness $\eta_c$ of the function $L_c(x,\omega)$ that indicates the shape of the cone that is SG approximated becomes more pronounced. Consequently, in a case where the sharpness $\eta_c$ of the function $L_c(x,\omega)$ that indicates the shape of the cone that is SG approximated is sufficiently larger than the sharpness $\eta_\rho$ of the SG which is expressed as the product of the SG approximated light emission radiance $L_{em}(-\omega)$) of the VSL and the ASG approximated BRDF of the shading point, it is possible to treat the product of the light emission radiance and the BRDF of the shading point as a constant in the rendering equation.

In other words, if it is established that the sharpness $\eta_c$ of the function $L_c(x,\omega)$ that indicates the shape of the cone that is SG approximated $\gg \eta_\rho$, the rendering equation of Equation 2 is $$L(x, \omega_{eye}) = \int_{S^2} L_{in}(x, \omega) f(x, \omega_{eye}, \omega)(n \cdot \omega) d\omega$$

$$= \int_{S^2} L_c(x, \omega) L_{em}(-\omega) f(x, \omega_{eye}, \omega)(n \cdot \omega) d\omega$$

$$= \int_{S^2} L_c(x, \omega) \rho(\omega) d\omega$$

$$\approx \frac{\Phi_{em}\rho(\xi_c)}{\pi r_{em}^2} \int_{S^2} L_c(x, \omega) d\omega$$

$$= \frac{\Phi_{em}\rho(\xi_c) \| \Omega \|}{\pi r_{em}^2}$$

$$\because \int_{S^2} \rho(\omega) d\omega = \int_{S^2} L_{em}(-\omega) \cdot f(x, \omega_{eye}, \omega)(n \cdot \omega) d\omega \approx \frac{\Phi_{em}\rho(\xi_c)}{\pi r_{em}^2},$$

$$L_c(x, \omega) \approx \mu_c G(\omega, \xi_c, \eta_c), \quad \| \Omega \| = \int_{S^2} L_c(x, \omega) d\omega = 2\pi(1 - \cos\theta)$$

and it is possible to express the BRDF of the shading point and the BRDF of the VSL without ASG or SG approximations. Because this expression does not SG approximate a BRDF, an unreducable error (bias) is removed. Meanwhile, because the BRDF is not SG approximated, there is an increasing error (dispersion), but this may converge when the number of VSLs increases. Also, in a case where the product of the two BRDFs is a sufficiently low frequency compared to $L_c$, it can be expected that such an increasing dispersion will be sufficiently small.

Note that, for example, by determining whether or not $$\eta_\rho < \alpha \eta_c$$

is established, i.e. whether or not the sampling number is large and the radius of the VSL is sufficiently small, for each shading point, it can be switched whether the scheme of the second embodiment or the variation is used, or whether a scheme that does not use SG or ASG approximation for the BRDF is used as in this variation. More specifically, if a is a finite value larger than 0 (for example 0.001), when the VPLs are defined to be infinite, the solution converges. Alternatively, distinguishing of the calculation scheme to be used may be performed by arranging a threshold in advance that is unrelated to the sharpness of the function $L_c(x,\omega)$ which indicates the shape of the cone that is SG approximated for the sharpness of the product of the ASG approximated BRDF of the shading point and the SG approximated BRDF of the VSL, or the sharpness of the product of the ASG approximated BRDF of the shading point and the SG approximated light emission radiance of the VSL.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Also, the information processing apparatus and the calculation method according to the present invention are realizable by a program executing the methods on one or more computers. The program is providable/distributable by being stored on a computer-readable storage medium or through an electronic communication line.

This application claims the benefit of Japanese Patent Application No. 2014-139981, filed Jul. 7, 2014, which is hereby incorporated by reference herein in its entirety.

What is claimed is:

1. A non-transitory computer-readable storage medium storing a program that causes one or more computers for calculating a radiance at a shading point in a 3D scene to execute:
   processing for translating an indirect light source defined virtually, which is caused by a direct light source being reflected by a predetermined surface, as a spherical light source having a predetermined spread;
   processing for approximating by a spherical Gaussian (SG approximating) a light emission radiance of the spherical light source and a bidirectional reflection distribution function (BRDF) at a position of the spherical light source;
   processing for SG approximating a function that indicates a solid angle of a cone defined by the shading point and the spherical light source;
   processing for obtaining an incident radiance at the shading point by calculating a product of the SG approximated light emission radiance of the spherical light source, the SG approximated function that indicates the solid angle, and the SG approximated BRDF at the position of the spherical light source;
   processing for SG approximating a BRDF at the shading point; and
   processing for obtaining the radiance at the shading point towards a viewpoint at which the shading point is to be rendered, by calculating a product of the incident radiance at the shading point and the SG approximated BRDF at the shading point,
   wherein, in a case where a sharpness of the SG approximated function that indicates the solid angle of the spherical light source is sufficiently larger than a product of the SG approximated light emission radiance of the spherical light source and the SG approximated BRDF at the shading point, causing the one or more computers not to execute the processing for SG approximating the BRDF at the shading point and the BRDF at the position of the spherical light source.

2. The non-transitory computer-readable storage medium according to claim 1, wherein at least one of the function that indicates the solid angle of the spherical light source and the BRDF at the shading point is approximated to an anisotropic spherical Gaussian.

3. The non-transitory computer-readable storage medium according to claim 1, wherein the program further causes the one or more computers to execute processing for categorizing into collections, in accordance with a predetermined condition, a plurality of the spherical light sources, and
   in the processing for SG approximating the BRDF at the position of the spherical light source, for each of the plurality of the spherical light sources in a collection, blur processing is applied to the BRDF at the position of the spherical light source in accordance with a size of the solid angle of the respective spherical light source for the perspective of the shading point.

4. The non-transitory computer-readable storage medium according to claim 1, wherein the program further causes the one or more computers to execute processing for categorizing into collections, in accordance with a predetermined condition, a plurality of the spherical light sources, and in the processing for SG approximating the BRDF at the position of the spherical light source, processing for averaging a lobe of a reflection for each of the plurality of spherical light sources in a collection is applied.

5. The non-transitory computer-readable storage medium according to claim 1, wherein the program further causes the one or more computers to execute processing for integrating radiances at the shading point calculated for each of the plurality of spherical light sources.

6. An information processing apparatus that calculates a radiance at a shading point in a 3D scene, the information processing apparatus comprising:

a processor; and a memory including instructions that, when executed by the processor, cause the processor to perform operations including:

translating an indirect light source defined virtually, which is caused by a direct light source being reflected by a predetermined surface, as a spherical light source having a predetermined spread;

approximating by a spherical Gaussian (SG approximating) a light emission radiance of the spherical light source and a bidirectional reflection distribution function (BRDF) at a position of the spherical light source;

SG approximating a function that indicates a solid angle of a cone defined by the shading point and the spherical light source;

calculating an incident radiance at the shading point by calculating a product of the SG approximated light emission radiance of the spherical light source, the SG approximated function that indicates the solid angle, and the SG approximated BRDF at the position of the spherical light source;

a SG approximating a BRDF at the shading point; and obtaining the radiance at the shading point towards a viewpoint at which the shading point is to be rendered, by calculating a product of the incident radiance at the shading point and the BRDF at the shading point, wherein, in a case where a sharpness of the SG approximated function that indicates the solid angle of the spherical light source is sufficiently larger than a product of the SG approximated light emission radiance of the spherical light source and the SG approximated BRDF at the shading point, causing the one or more computers not to execute the processing for SG approximating the BRDF at the shading point and the BRDF at the position of the spherical light source.

7. A calculation method for a radiance at a shading point in a 3D scene, the calculation method comprising:

translating an indirect light source defined virtually, which is caused by a direct light source being reflected by a predetermined surface, as a spherical light source having a predetermined spread;

approximating by a spherical Gaussian (SG approximating) a light emission radiance of the spherical light source and a bidirectional reflection distribution function (BRDF) at a position of the spherical light source;

SG approximating a function that indicates a solid angle of a cone defined by the shading point and the spherical light source;

obtaining an incident radiance at the shading point by calculating a product of the SG approximated light emission radiance of the spherical light source, the SG approximated function that indicates the solid angle, and the SG approximated BRDF at the position of the spherical light source;

SG approximating a BRDF at the shading point; and obtaining the radiance at the shading point towards a viewpoint at which the shading point is to be rendered, by calculating a product of the incident radiance at the shading point and the SG approximated BRDF at the shading point, wherein, in a case where a sharpness of the SG approximated function that indicates the solid angle of the spherical light source is sufficiently larger than a product of the SG approximated light emission radiance of the spherical light source and the SG approximated BRDF at the shading point, causing the one or more computers not to execute the processing for SG approximating the BRDF at the shading point and the BRDF at the position of the spherical light source.

\* \* \* \* \*